Dec. 9, 1958    K. J. BRIMLEY    2,863,353
MANUFACTURE OF PLASTIC INCENDIARY MATERIALS
Filed March 26, 1956
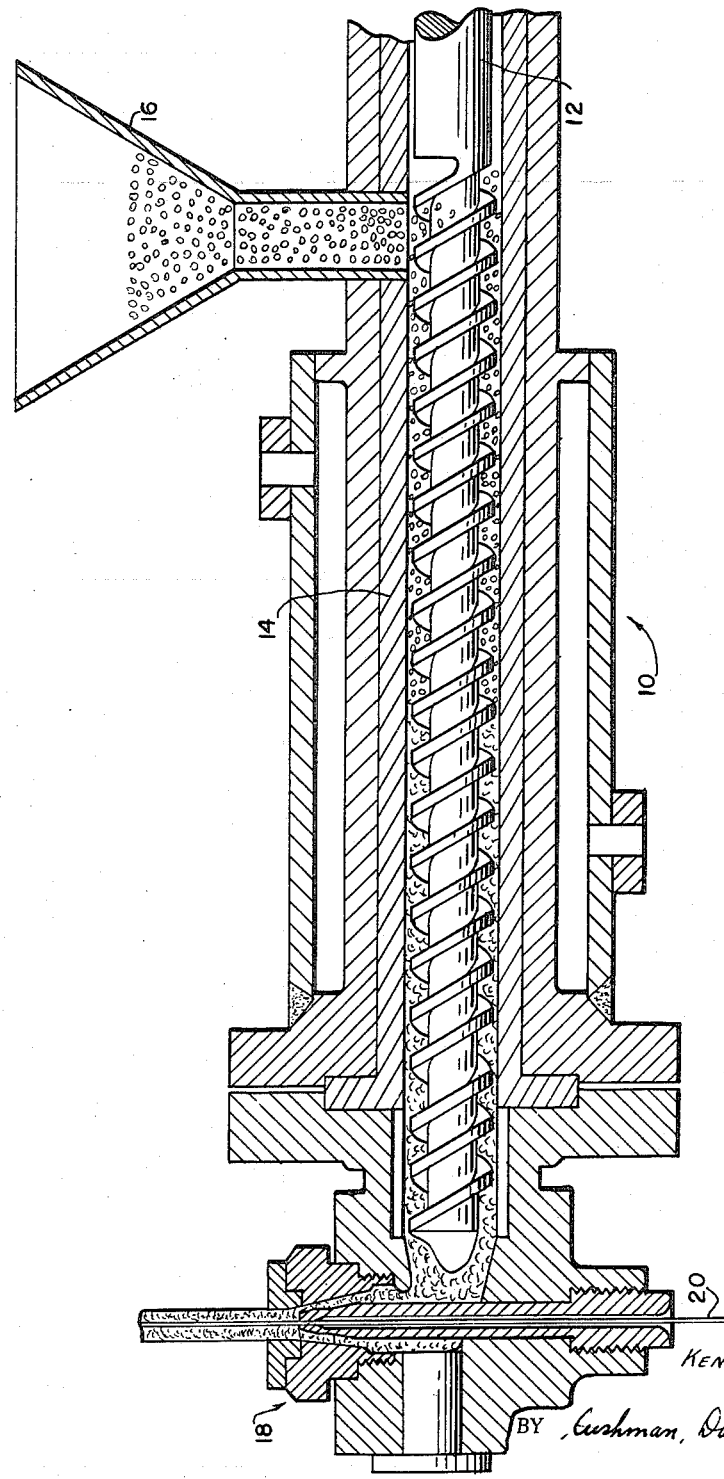
INVENTOR
KENNETH JOHN BRIMLEY
BY Cushman, Darby & Cushman
ATTORNEYS

2,863,353
MANUFACTURE OF PLASTIC INCENDIARY MATERIALS

Kenneth John Brimley, Stevenston, Scotland, assignor to Imperial Chemical Industries Limited, London, England, a corporation of Great Britain Application March 26, 1956, Serial No. 574,038

Claims priority, application Great Britain June 8, 1955

1 Claim. (Cl. 86—1)

The present invention relates to the manufacture of extruded incendiary cords of thermoplastic consistency comprising pulverulent oxidising and pulverulent reducing agents and a thermoplastic binder, particularly for use in igniter cord and safety fuse having a core of a thermoplastic incendiary composition.

The usual procedure for the production of such thermoplastic incendiary composition is to mix the pulverulent oxidising agents and pulverulent reducing agents with the thermoplastic binder in a mechanical mixer to cool the resulting bulk product while still warm, and to reduce the bulk product to sheet or strip form for subsequent hand feeding into a heated extrusion machine, usually of the worm type. Preferably said bulk product is either formed by working the pulverulent oxidising agent or the pulverulent reducing agent into the thermoplastic binder and subsequently working the pulverulent reducing agent or pulverulent oxidising agent component into the resulting mixture, as the case may be. The disadvantages of such procedures are in the fire hazards arising from the preparation and handling of the incendiary composition in bulk and also from the necessity to re-heat the composition, when in strip form, prior to extrusion and the possible formation on the heated surfaces of de-plasticised material which is particularly prone to ignition by friction. Moreover, for automatic operation of the extrusion machine it would be desirable to feed the composition in chip form, but this has hitherto been impracticable because its reduction to chip form by mechanical means is an operation comprising an excessive hazard.

According to the present invention the process for the production of extruded incendiary cords of thermoplastic consistency and desired composition comprising at least one pulverulent oxidising agent, at least one pulverulent reducing agent and at least one thermoplastic binder comprises forming substantially in the absence of any pulverulent reducing agent at least one mixture comprising at least one pulverulent oxidising agent and a thermoplastic binder and substantially in the absence of any pulverulent oxidising agent at least one other mixture comprising at least one pulverulent reducing agent and a thermoplastic binder, forming an intimate admixture of desired composition for said incendiary cords in a heated extrusion machine of the worm type by introducing said mixtures therein and hot working them together into said admixture, and extruding the admixture from said machine.

The two kinds of thermoplastic mixtures, i. e. one containing the pulverulent reducing agents and the other the pulverulent oxidising agents, may each be reduced to chip form by cutting or grinding with a high degree of safety and in this form fed into a hot worm extruder.

It has been confirmed that although mixtures consisting of solid chlorates or perchlorates with or without red lead and a thermoplastic binder are capable of ignition by friction they burn much less furiously and if being made to burn can be more easily extinguished than compositions which contain pulverulent reducing agents as well as these oxidising agents. It has also been found that when plasticised nitrocellulose is the binder and the mixture contains oxidising agents other than chlorates or perchlorates, as for example oxides of lead, potassium nitrate or barium nitrate, or reducing agents, these mixtures may be ignited by a fierce flame but not readily by friction. It has been ascertained, for instance, that a mixture consisting of plasticised nitrocellulose, red lead and potassium nitrate will not easily ignite under normal atmospheric conditions either by impact, friction or with the aid of a match or fusee. Furthermore, it has been found that a mixture containing a reducing agent suitable for admixture with this mixture and consisting of plasticised nitrocellulose and silicon or a metal cannot be ignited except by a very powerful flame when it will burn quietly or with an easily extinguishable flame.

Preferably the incendiary thermoplastic admixture of desired composition is formed from two separate mixtures, one containing all the oxidising agents and the other all the reducing agents. These admixtures, however, if desired may be formed from more than two mixtures. Preferably the said mixtures are fed into the extrusion machine as separate streams but if desired a coarse mixture of the two or more mixtures can be introduced as a single stream.

It has, moreover, been found that in addition to the obvious advantages of a process entailing the handling of safe materials until the operation of admixture in an extrusion machine, it is possible, because the mixtures are in chip form, to adopt remote control for the extrusion operation with consequential greatly increased safety to the operator. It has also been found that the incendiary cords manufactured according to the invention may often have faster burning properties, presumably because of the shorter time during which the pulverulent oxidising agents and reducing agents remain in contact with one another at elevated temperatures, than cords of the same composition made by methods involving the formation of bulk mixtures of pulverulent oxidising agents, pulverulent reducing agents and a thermoplastic binder.

The invention is illustrated by the following examples wherein parts are parts by weight, and by the exemplary form of extrusion machine that may be utilized in connection with the invention. This machine is illustrated in longitudinal section in the accompanying drawing.

Referring now to the drawing, the extrusion machine is indicated generally by the numeral 10 and includes a worm conveyor shaft 12 arranged for rotation in a cylinder 14. A suitable feed hopper 16 is shown at one end of the cylinder 14 with any conventional extrusion head 18 being provided at the other end of the cylinder. As shown, a thin wire or filament like element 20 passes through the head 18 to be coated therein by the admixture of the reducing and oxidising agents, as will be again referred to hereinafter.

Example 1

33 parts plasticised nitrocellulose consisting of a high nitrogen extra low viscosity industrial nitrocotton 50 parts, dibutyl phthalate 48 parts, diphenylamine 2 parts, and finely ground citric acid 2 parts are mixed in a heated Werner Pfleiderer mixer with 66 parts finely ground silicon of specific surface 38,000 cm.$^2$/cu. cm. and 1 part diethyl centralite.

Another mixture is formed by mixing 14 parts plasticised nitrocellulose in a heated Werner Pfleiderer mixer with 60.6 parts red lead, 24.7 parts potassium perchlorate and 0.7 part diethyl centralite.

Each mixture is rolled into sheet form and when cold reduced to granules by cutting into dice approximately 3/16" cube. A coarse mixture of the granules in the ratio of 1 part by weight of the first mentioned mixture with 3 parts by weight of the second mentioned mixture is fed into a single screw extruder, such as that shown, the cylinder 14 of which is heated to approximately 70° C. and the extrusion head 18 to 100° C. The resulting admixture is extruded on to a 25 S. W. G. bare copper wire 20, passing through the extrusion head, to an overall diameter of 0.065". This product is subsequently coated with a film of polyethylene approximately 0.004" thick to give a final product having a burning speed of 36 sec./yd.

The rate of throughput of the coarse mixture through the extruder is 50 lbs. per hour. The capacity of the extruder is approximately such as to hold 2 lbs. of the coarse mixture. The mixtures are thus converted at 70° C. into the admixture in a mixing time of less than 2 minutes.

If the admixture is produced in bulk in an incorporator a mixing time of 1 to 5 hours is usually needed depending on the scale of working and type of incorporator and the temperature required is usually 80° to 100° C.

*Example 2*

23 parts of a plastic consisting of a mixture of 60:40 polystyrene (molecular weight 80,000) and dibutyl phthalate are mixed in a heated Werner Pfleiderer mixer with 77 parts finely ground silicon of specific surface 32,000 cm.$^2$/cu. cm.

Another mixture is formed by mixing 10.7 parts of the 60:40 polystyrene:dibutyl phthalate plastic in a heated Werner Pfleiderer mixer with 64.0 parts lead dioxide and 25.3 parts potassium perchlorate.

Each mixture is rolled into sheet form and when cold reduced to granules by cutting into dice approximately 3/16" cube. A coarse mixture of the granules in the ratio of 1 part by weight of the first mentioned mixture with 3 parts by weight of the second mentioned mixture is fed into a single screw extruder, such as that shown, the cylinder 14 of which is heated to approximately 70° C. and the extrusion head 18 to 100° C. The resulting admixture is extruded on to a 25 S. W. G. bare copper wire 20, passing through the extrusion head, to an overall diameter of 0.065". This product is subsequently coated with a film of polyethylene approximately 0.004" thick to give a final product having a burning speed of approximately 44 sec./yd.

*Example 3*

22 parts of a plastic consisting of 40 parts of methyl methacrylate polymer with 60 parts of dibutyl phthalate are mixed in a heated Werner Pfleiderer mixer with 78 parts finely ground silicon of specific surface 32,000 cm.$^2$/cu. cm.

Another mixture is formed by mixing 13.3 parts of the 40:60 methyl methacrylate:dibutyl phthalate plastic in a heated Werner Pfleiderer mixer with 86.7 parts lead dioxide.

Each mixture is rolled into sheet form and when cold reduced to granules by cutting into dice approximately 3/16" cube. A coarse mixture of the granules in the ratio of 1 part by weight of the first mentioned mixture with 3 parts by weight of the second mentioned mixture is fed into a single screw extruder, such as that shown, the cylinder 14 of which is heated to approximately 70° C. and the extrusion head 18 to 100° C. The resulting admixture is extruded on to a 25 S. W. G. bare copper wire 20, passing through the extrusion head, to an overall diameter of 0.065". This product is subsequently coated with a film of polyethylene approximately 0.004" thick to give a final product having a burning speed of 60 sec./yd.

*Example 4*

29.5 parts plasticised nitrocellulose consisting of a high nitrogen extra low viscosity industrial nitrocotton 50 parts, dibutyl phthalate 48 parts, diphenylamine 2 parts and finely ground citric acid 2 parts are mixed in a heated Werner Pfleiderer mixer with 69.9 parts silicon of specific surface 12,000 cm.$^2$/cu. cm. and 0.6 part diethyl centralite.

Another mixture is formed by mixing 17.1 parts plasticised nitrocellulose in a heated Werner Pfleiderer mixer with 58.1 parts red lead, 24.2 parts potassium nitrate and 0.6 part diethyl centralite.

The two mixtures are separately rolled when hot into thin sheets and then cut into granules approximately 3/16" cube when cold.

A coarse mixture of the granules is made in the ratio of 1 part of the first mentioned mixture to 3 parts of the second mentioned mixture and fed into a single screw extruder, such as that shown, the cylinder 14 of which is approximately heated to 70° C. and the extrusion head 18 to 100° C. Through the extrusion head is passed a semi-cord 20 consisting of three paper yarns each of 0.023" diameter produced by twisting paper strips 6 mm. wide and each coated to a diameter of 0.043" with a mixture of nitrocellulose dope in acetone and finely ground blackpowder wherein the whole is bound together when dry with 3 yarns each of 6 ends of 30's cotton.

The resulting admixture is extruded on to this semi-cord to an overall diameter of 0.093" and the resulting product subsequently is coated with a film of polyethylene 0.004" thick.

The product is a fast igniter cord burning faster than 1 sec./ft.

*Example 5*

23.3 parts plasticised nitrocellulose consisting of a high nitrogen extra low viscosity industrial nitrocotton 50 parts, dibutyl phthalate 48 parts, diphenylamine 2 parts, and finely ground citric acid 2 parts are mixed in a Werner Pfleiderer mixer with 75.7 parts silicon of specific surface 30,000 cm.$^2$/cu. cm. and 1.0 part diethyl centralite.

Another mixture is formed by mixing 17.1 parts plasticised nitrocellulose in a heated Werner Pfleiderer mixer with 58.1 parts red lead, 24.2 parts potassium nitrate and 0.6 part diethyl centralite.

Each mixture is rolled into sheet form and when cold reduced to granules by cutting into dice approximately 3/16" cube. A coarse mixture of the granules in the ratio of 1 part by weight of the first mentioned mixture with 3 parts by weight of the second mentioned mixture is fed into a single screw extruder, such as that shown, the cylinder 14 of which is heated to approximately 70° C. and the extrusion head 18 to 100° C. Through the extrusion head is passed a glass yarn 20 of 450 5/7 count on which the resulting composition is extruded to an overall diameter of 0.065". This product is subsequently coated with polyethylene 0.004" thick and then with jute yarns applied spirally. The first jute yarns are 2 yarns each of 3 lea applied clockwise at 10 turns/ft. and the second 4 yarns each of 4 lea applied counter clockwise at 26 turns/ft.

This product is coated with bitumen to an overall diameter of 0.165" and is then given a final coat of polyethylene 0.005" thick.

The resulting product is a fuse of exceptional waterproofness burning at approximately 150 sec./yd.

Although in each of the above examples a coarse mixture of the two granular mixtures is fed into the extruder preferably the two granular mixtures are fed separately into the extruder by employing suitable feeding apparatus permitting control of the rate of delivery of each granular mixture.

What I claim is:

A process for the production of thermoplastic extruded incendiary cords comprising at least one oxidising agent, at least one reducing agent and at least one thermoplastic binder which comprises forming substantially in the absence of any reducing agent at least one mixture comprising at least one oxidising agent and a thermoplastic binder and substantially in the absence of any oxidising agent at least one other mixture comprising at least one reducing agent and a thermoplastic binder, reducing the said mixtures to chip form by cutting or grinding, forming an intimate admixture of said agents and binder by feeding them into a heated extrusion machine of the worm type and hot working them together into said admixture and extruding the admixture from said machine.

References Cited in the file of this patent

UNITED STATES PATENTS

| | | |
|---|---|---|
| 2,363,569 | Caldwell et al. | Nov. 28, 1944 |
| 2,640,771 | Clauser et al. | June 2, 1953 |

FOREIGN PATENTS

| | | |
|---|---|---|
| 652,542 | Great Britain | Apr. 25, 1951 |